May 2, 1944.   W. PATERSON ET AL   2,347,927
FILTER
Filed Jan. 17, 1940    2 Sheets-Sheet 1

Inventors
W. Paterson &
O. C. Kerrison
By: Glascock Downing & Seebold
Attys.

May 2, 1944.  W. PATERSON ET AL  2,347,927
FILTER
Filed Jan. 17, 1940  2 Sheets-Sheet 2

Inventors,
W. Paterson &
O. C. Herrison
By: Glascock Downing & Seebold
Attys.

Patented May 2, 1944

2,347,927

UNITED STATES PATENT OFFICE 2,347,927

FILTER

William Paterson and Oscar Carl Kerrison,
London, England

Application January 17, 1940, Serial No. 314,313
In Great Britain December 31, 1938

14 Claims. (Cl. 210—169)

This invention relates to filters of the type in which the filtering medium consists of silicious earth, kieselguhr, or similar material deposited from suspension in the liquid to be filtered on to a porous or metallic support, such filters being primarily intended for relatively small water supplies or for filtering oil or other liquids.

With such filters it is known that for an interval of time whilst the bed is forming and compacting on its support a volume of impure liquid passes the filter and tends to form a deposit in the interstices or pores of the metallic or porous support, gradually offering increased resistance to flow in addition to that resistance expected to be offered by the filter bed, until a time is reached when the filter support must be dismantled for cleaning. Moreover, the impure liquid discharged during such formation and compacting of the filter bed must be diverted to waste by the manipulation of suitable valves to avoid contamination of the liquid already filtered.

A further defect of the type of filter having interstices or pores in the filter bed support upon or within which organic matter may deposit during commencement of the filtration process is that such organic matter may become the pabulum for bacteria which may recontaminate the filtered liquid unless a sterilisation process is applied to the liquid after filtration. Such post-filtration sterilisation may give rise to the production of taste in the filtrate.

One object of the present invention is to provide an improved filter of this type in which the interstices of the support for the filter bed are of such a form that whilst effectively retaining the filter bed they are free from the tendency to become choked by deposited impurities. A further object of the invention is to ensure that the first imperfectly filtered liquid is automatically discharged, either to waste or to the pump suction for re-filtration, so that all liquid passing into supply is clear and free from any fine filtering substance or other impurity in suspension.

It is also an object of the present invention to provide a filter of the type described in which a process of sterilisation may, if desired, be applied to the liquid before filtration and any excess of sterilant be removed by the filtering medium without danger of after-contamination or the production of taste.

The invention consists in a filter of the kind referred to in which the support for the filtering bed is formed of wire wound helically upon a cage or former with a clearance between adjacent turns sufficiently small to ensure that the filtering medium will not pass through but will form a compact bed or layer on the surface of the helix, the cross-sectional shape of the wire being such as to ensure a minimum depth of interstice and a maximum self-cleaning effect.

The invention also consists in a filter according to the preceding paragraph in which there is a secondary outer layer of helically wound wire which may be of larger cross-section and with a larger clearance between adjacent turns, such outer helix giving additional stability to the filter bed and at the same time forming a support for an outer filter bed superimposed directly upon the inner filtering bed. A release of pressure of the liquid on the inlet side of the filter bed, effecting a slight reversal of flow through the filter from outlet to inlet, causes the outer filtering bed to disintegrate and detach itself from the outer helix whilst leaving the inner filtering bed substantially intact, so facilitating the reforming of the filtering surface with a minimum disturbance of the filtration effect. With the object of aiding the detachment of the outer filtering bed the outer winding is preferably in the form of a helix separated by a small space from the inner winding, such outer helix being reinforced by wires or strips outwardly affixed at intervals in the direction of the axis of the helix and serving to cut the outer bed into segments, which readily detach themselves and slide off when required on cessation of the filtering process, with substantially little interference with the inner filtering bed. On resumption of the filtration process the outer bed is reformed as a new filtering film.

Further, with a view to facilitating the breakdown and re-establishment of the filtering bed, it may be arranged that on or immediately after the closing of the inlet valve a relief to waste is opened on the inlet side of the filter, causing a reduction of pressure which tends to enable the filtering medium to fall away from the support against which it has been compacted during the filtration process by the preponderance of the inlet pressure. It may be arranged that there is a slight reverse flow of liquid through the filter support aiding the detachment of the filtering material which falls to the bottom of the inlet chamber in a suitable position for its reflotation and recompacting on the support when the inlet valve is reopened. This effect can be conveniently secured by arranging that the act of closing the inlet valve automatically opens the relief and if desired closes it again after the interval of time necessary to effect detachment of the bed.

On re-opening the inlet valve the entering liquid re-floats and re-forms the bed on the support. This end is accomplished by shaping the bottom in the form of a pocket in which material from the disintegrated filter bed will be caught and providing an inlet for liquid to be filtered positioned to discharge into the bottom of the pocket. By this means the opening of the inlet valve causes the entering liquid to pick up the disintegrated filter material, to resuspend it in the liquid and to readily reform the material into a bed upon the support.

It has been noted above that, with this type of filter, for a short interval of time before the bed is compacted impure liquid may be discharged from the filter outlet, and it is one of the objects of this invention to ensure that the first imperfectly filtered liquid is automatically by-passed to waste, or as may be required. This object is ensured by arranging that the closing of the inlet valve, either directly or indirectly through fall of pressure, opens a by-pass valve on the filter outlet from which the first filtrate discharges. This remains in the open position for the interval of time necessary to ensure that the filtrate has reached the required standard of purity. With a high rate of flow this standard may be reached in a few seconds, but at lower rates of flow it may take one or two minutes for the bed to be compacted, and the by-pass valve closing gear may be arranged to be adjustable over the necessary period of time to meet all conditions.

One convenient way of effecting this is to utilise the drop of pressure resulting from the opening of the relief valve on the inlet side of the filter to effect the opening of the by-pass, which remains in the open position until the re-establishment of the filtering process effects a gradual closing of this valve.

It must be understood, however, that in place of relying on a difference of pressure to operate the closing of the by-pass any other convenient means may be adopted.

Further features of the invention will be apparent from the description given hereafter.

The accompanying drawings illustrate two modes of carrying out the invention:

Figure 1:
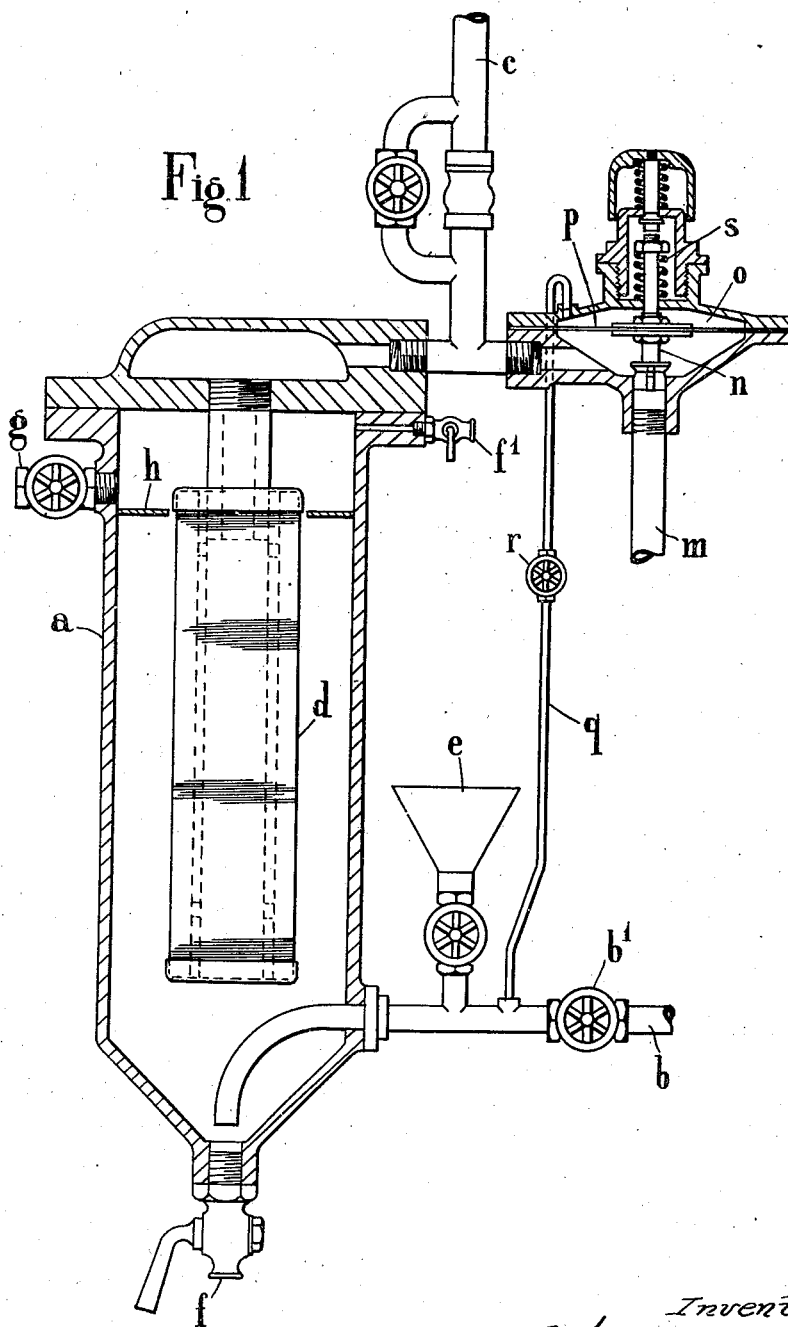
Figure 1 is a diagrammatic view showing the layout of one form of filtering apparatus in accordance with the invention.
Figure 3:
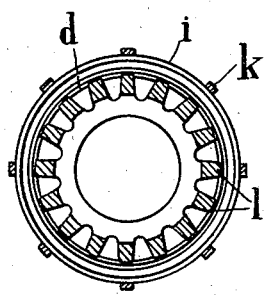
Figure 3 is a section on the line 3—3 of Figure 2.

In carrying our invention into effect in one convenient manner, as shown in Figure 1, we form our improved filter with an external casing $a$ of a size and shape depending upon the purpose for which the filter is required, and having a pocket-like lower end $a^1$ into which liquid to be filtered is discharged by the extremity $b^2$ of the inlet $b$. Within this container and separating the inlet $b$ for liquid to be filtered from the outlet $c$ for filtered liquid, we arrange our filter support $d$ which consists of wire of, say, 1/28th of an inch diameter wound in the form of a helix having a clearance of, say, one or two thousandths of an inch between adjacent turns, it being understood, however, that these details are by way of example only and that the size and cross-sectional shape of the wire and the clearance between adjacent turns may be varied to suit any given requirements. As shown in the drawings we prefer to use a relatively large number of juxtaposed ribs for the core. Figure 3 shows sixteen such ribs. It will be understood that the number may vary depending on the size of the unit. However, even in the smallest units the number should be five or six, or more. As is well known in the art, the filter bed support is subjected to pressures of from 50 pounds to 100 pounds per square inch. It is therefore necessary to avoid spans of any considerable length between ribs in order to avoid deforming the wire due to such pressures. It is also desirable to have a large number of ribs in order to avoid sharp angles in the wire wound on the core. Clearly there is a greater possibility of rupturing the wire if there were only four ribs and right angle turns in the wire wound thereon, than if the number of ribs is increased and the angles enlarged.

In operation, a certain amount of kieselguhr or like material is introduced into the container or is introduced into the supply of water or other liquid to be filtered (as by the charging funnel $e$) and during the passage of the water or other liquid through the wire screen the kieselguhr suspended in the liquid is deposited upon the screen and in a short time forms a filtering bed thereon by which the water or other liquid will be effectively filtered.

When it is desired to clean or renew the filtering medium or to clean the wire screen, the flow of liquid may be reversed so that the kieselguhr is detached from the screen and it may either be allowed to re-form the bed or it may be removed (as through the waste tap $f$) and a fresh supply introduced.

The detachment of the filtering medium may also be aided by a current of water introduced at the uppermost part of the filter and caused to flow filmwise downwardly along the length of the filter support, this being conveniently effected by a connection $g$ delivering the liquid above the plate $h$ by which the filmwise flow is directed.

Figure 2:
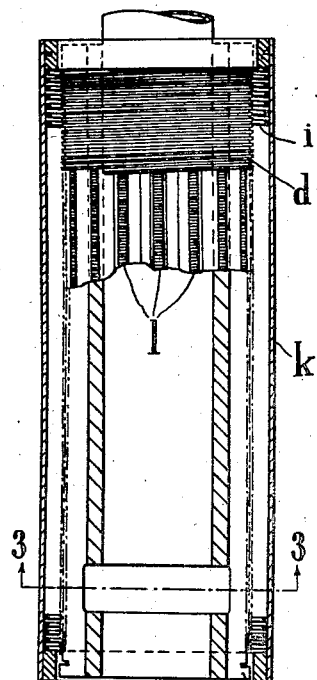
Figure 2 is a view showing an alternative form of filtering unit or element.

Under certain conditions it may be preferable not to cause the whole of the filtering material to be detached from its support and in order to obviate this we may arrange around the supporting screen a second layer $i$ (Figure 2) of wire of, say, 18-gauge with a larger clearance between adjacent turns upon which an outer filter bed may be deposited. A slight reversal of flow through the filter support will cause this secondary filter bed to be detached from the outer winding without material disturbance of the inner filter bed so permitting resumption of the filtering process with a minimum waste of partially clarified water. Longitudinal wires or strips $k$ of metal or other suitable material affixed to the outer winding serve to reinforce this and also to divide the outer filtering bed into segmental strips which are readily detached by a slight reversal of flow or by gravity when the filtration process is discontinued.

The wire employed for the inner and outer helices is preferably, but not necessarily, of circular section and since the wire can be wound very uniformly on the cage or other former the filter is capable of giving a very uniform discharge of liquid through its entire area so ensuring uniform deposition of the filtering material.

The cage or former may be constructed of longitudinal rods of metal or other material or as shown in the drawings it may consist of an apertured sleeve having ribs $l$ thereon round which the wire is wound helically. The filter unit may be associated with an inner filtering tube of ceramic or other porous material or in some cases such a tube of ceramic or other porous material may be formed with external ribs or projections over which the wire is wound to form the cage or former for the kieselguhr or the like.

It will be clear that we may vary the material chosen for our filter bed support, the manner in which it is wound on its former and the number of concentric layers constituting the support depending upon any practical requirements that may have to be fulfilled.

Further with a view to automatically by-passing the first filtrate we may arrange the filter with two alternative outlets, one $m$ by-passing to waste (or as may be required) and the other $c$ discharging fully filtered liquid to supply. A valve $n$ controlling the by-pass outlet is arranged to be opened automatically when the filtration process ceases, and closed automatically at an adjustable period of time after filtration has recommenced. In carrying this into effect in one convenient manner we provide on the outlet side of the filter a chamber $o$ divided by an elastic diaphragm $p$ into an upper and a lower compartment, each separated from the other. To the upper of these compartments unfiltered liquid tapped from the inlet pipe to the filter at a point after the inlet valve (as by the pipe $q$) is admitted at a rate controlled by a needle valve or other suitable means $r$. The lower compartment which communicates with the outlet side of the filter has the by-pass outlet $m$ discharging to waste when the diaphragm is in a position of rest. The opening of the filter inlet valve $b^1$ admits liquid at the predetermined rate into the upper chamber and causes the diaphragm to be gradually downwardly distended until the diaphragm $p$ or the valve $n$ operated thereby closes the by-pass outlet, after which period of time the now fully filtered water passes into supply by means of the discharge provided at $c$. On the closing of the inlet valve and opening of a relief valve on the inlet side of the filter, $f$ or $f'$, the pressure on the diaphragm in the upper chamber is released and the diaphragm returns to its position of rest causing the by-pass outlet $m$ to be opened in readiness for discharging to waste or as may be required on the resumption of the filtration process. The action of the diaphragm may be aided or retarded by a spring $s$ or other convenient means and where the fully filtered liquid is not required to discharge against head a loaded valve may be inserted in the filtered water outlet pipe to give the requisite back pressure to divert the first filtrate through the by-pass, or the same or another diaphragm may be caused to operate a second valve opening the discharge to supply as the by-pass is closed. It will be understood that the references to upper and lower compartments, diaphragms and the like are by way of illustration only and any other convenient means of control or operation may be employed.

As used herein "filtering material" designates a filtering medium such as siliceous earth, kieselguhr, activated carbon and the like, and "filter bed" designates such filtering material supported on a permeable support.

Further in any modification of our invention we may substitute for or incorporate or associate with the filtering material any other suitable material as, for example, activated carbon having the property of removing an excess of sterilant previously added to the unfiltered liquid. In this manner the liquid to be filtered may be treated with an excess of sterilising agent without fear of the development of taste or odour in the filtrate and without the danger of after-contamination.

We claim:

1. A filter unit comprising a casing adapted to permit a flow of liquid therethrough, a liquid inlet communicating with the casing, means for introducing filtering material into the flow of liquid passing into said casing, means for supporting a filter bed composed of filtering material so introduced within said casing and across the flow of the liquid therethrough, means for washing said filtering material from said filter bed supporting means, means in the form of a pocket below said bed supporting means for holding said removed filtering material, said inlet discharging into the bottom of said pocket, a filtered liquid outlet from said casing, and means for removing filtering material from said casing.

2. A filter unit comprising a casing, the bottom of said casing being shaped to form a pocket, an inlet for fluid to said casing discharging directly into said pocket, an outlet for fluid from said casing, a filter bed support mounted in said casing between said inlet and said outlet, said support consisting of a rigid cage closed at one end and open for fluid flow at the other and having a wire helically wound thereon, means for supplying filter bed material to said casing, a waste discharge from said casing, and means to direct a flow of wash water against the outside of said filter bed support.

3. A filter unit comprising a casing having a depression in the bottom of pocket-like form, a waste discharge leading from said depression, a raw water inlet discharging into the bottom of said depression, a filtered water outlet from said casing, a filter bed support mounted in said casing across the flow of water therethrough from said inlet to said outlet, said support comprising a ribbed core upon which is helically wound and fixed wire with a clearance between the adjacent turns sufficiently small to hold a filter bed formed thereon of discrete particles, and means to form and reform a filter bed thereon, said means including said depression and said inlet and including means for delivering filter bed forming material as discrete particles into said casing.

4. A filter unit comprising a casing provided with a bottom shaped to form a pocket, an inlet into said casing discharging into said pocket, said inlet being positioned to direct the discharge therefrom into the lower part of said pocket, an outlet from said casing, a filter bed support mounted within said casing across the flow of water therethrough and connected to said outlet, which filter bed support comprises a porous body upon which is helically wound wire with a clearance between adjacent turns sufficiently small to hold a filter bed in the form of a layer of discrete particles hydraulically deposited directly on said wire, means for supplying filter bed material to said casing, and a waste discharge to the inlet to said casing.

5. A filter unit comprising a casing provided with a bottom shaped to form a pocket, an inlet into said casing discharging into said pocket, an outlet from said casing, a filter bed support mounted within said casing and connected to said outlet, said filter bed support comprising a ribbed core upon which is helically wound wire with a clearance between adjacent turns sufficiently small to hold filtering material, and a second helically wound coil of wire rigidly held in spaced relationship around the first-mentioned helically wound wire, the second-mentioned helically wound wire being rigidly secured to rigid longitudinal ribs and having a greater clearance between adjacent turns than the first-mentioned helically wound wire, means for supplying filter bed material to said casing, and a waste discharge from the pocket of said casing.

6. In a filter unit of the kind described in claim 3 means for facilitating the removal of filtering material from said filter bed support, comprising means for passing a film of liquid downwardly over the outer surface of the filter bed support.

7. In a filter unit comprising a casing provided with a bottom shaped to form a pocket, an inlet into said casing discharging into said pocket, the discharge opening of said inlet facing downwardly toward the lowest point in said pocket, an outlet from said casing, means for supplying filter bed material to said casing, a waste discharge from said casing, a filter bed support vertically mounted in said casing comprising a ribbed core upon which is helically wound fine wire with a clearance between adjacent turns sufficiently small to prevent passage of filter bed material therethrough, means for facilitating removal of filtering material from said filter bed support comprising an upper chamber in said casing with an annular opening therein closely surrounding the upper portion of said filter bed support.

8. A filter unit according to claim 3 having means for automatically bypassing to waste the liquid first passing through the filter on commencement or recommencement of filtration, said means comprising a pressure operated valve in said outlet, and a conduit connecting said valve to the inlet of said casing.

9. A filter unit according to claim 3 having means for automatically bypassing to waste the liquid first passing through said filter on the commencement of filtration, comprising a pressure operated valve in said outlet normally open to waste, a conduit connnecting said valve to said inlet and a valve on said conduit.

10. A filter according to claim 3 having means for automatically bypassing to waste the liquid first passing through said filter on the commencement of filtration, said means comprising a valve in said outlet normally open to waste, a valve actuating means connected to said valve, said valve actuating means comprising a pressure responsive device, one side of which is connected to the outlet and the other side by a restricted conduit to the inlet into said filter casing, said connection between said chamber and said inlet being provided with an adjustable valve means.

11. In a filter unit comprising a casing having a hopper shaped bottom, an inlet for liquid to be filtered, an outlet for filtered liquid, means for supplying filtering material in the form of discrete particles, an outlet for spent filtering material, a filter bed support within said casing across the flow of liquid therethrough comprising a vertical ribbed core upon which core is helically wound fine wire with clearance between adjacent turns sufficiently small to prevent passage of filtering material therethrough connected to said outlet, means for removing filtering material from said filter bed support comprising means for directing an annular film of water downwardly over the outside of said filter bed support, said last named means comprising an annular slot surrounding the upper part of said core, and means for resuspending said filtering material in liquid passing through said casing comprising a pocket in the bottom of said casing adapted to catch filtering material removed from said filter bed support and means for discharging the liquid to be filtered downwardly against the bottom of said pocket.

12. The method of disintegrating a bed of filtering material supported on a substantially vertical filter bed support within a filter and reforming the same on the filter bed support comprising first flowing a film of liquid downwardly over the outer surface of said filter bed and subsequently directing the flow of liquid to be filtered upon said disintegrated filter bed.

13. In the clarification of turbid water by filtration through filter material in the form of a bed composed of discrete particles of absorbent material, which filter material is supported on a fixed permeable supporting member, the steps of introducing said filter material into water to be filtered, depositing said material on said supporting member by passage of said water through said member, periodically disintegrating the filter bed so formed on said supporting member and then redepositing the disintegrated bed on said member by a further passage of water to be filtered through said member.

14. The process of filtering turbid water by means of filtering material suspendable in said water and a permeable supporting bed for said material consisting in introducing the suspendable filtering material into a stream of said water and passing said stream through said permeable bed, retaining said filtering material on said supporting bed to form therewith a filter bed, filtering the water in said stream through said filter bed until an operative limit for said filter bed is reached, then interrupting said stream and flushing said filtering material from said supporting bed while retaining the flushed material in the path of said stream, then renewing said stream and resuspending said material therein and redepositing same on said supporting bed to reform said filter bed, and eventually flushing said material to waste.

WILLIAM PATERSON.
OSCAR CARL KERRISON.

Certificate of Correction

Patent No. 2,347,927                                                     May 2, 1944

WILLIAM PATERSON ET AL.

It is hereby certified that error appears in the printed specification of the above numbered patent requiring correction as follows:

Page 3, second column, line 69, strike out the words "to the inlet to" and insert instead *from the pocket of*;

and that the said Letters Patent should be read as corrected above, so that the same may conform to the record of the case in the Patent Office.

Signed and sealed this 28th day of November, A. D. 1950.

[SEAL]

THOMAS F. MURPHY,
*Assistant Commissioner of Patents.*